United States Patent [19]

Wilson

[11] Patent Number: 4,514,970
[45] Date of Patent: May 7, 1985

[54] RAKE ATTACHMENT

[75] Inventor: Richard C. Wilson, Champlin, Minn.

[73] Assignee: Tie Down Engineering, Inc., Atlanta, Ga.

[21] Appl. No.: 578,485

[22] Filed: Feb. 9, 1984

[51] Int. Cl.³ .............................................. A01D 7/00
[52] U.S. Cl. .............................. 56/400.12; 56/400.16; 294/50.8
[58] Field of Search ........... 56/400.12, 400.16, 400.06, 56/400.04; 294/50.8, 50.9

[56] References Cited

U.S. PATENT DOCUMENTS

| 1,588,927 | 6/1926 | Willis | 56/400.12 |
| 2,902,815 | 9/1959 | Gallo, Sr. | 56/400.04 |
| 2,908,131 | 10/1959 | Ross | 56/400.12 |
| 3,221,485 | 12/1965 | Jenkins | 56/400.06 |
| 3,688,484 | 9/1972 | Cox | 56/400.12 |
| 3,833,250 | 9/1974 | Lawrence | 56/400.12 |
| 4,057,277 | 11/1977 | Burkholder | 56/400.12 |
| 4,185,443 | 1/1980 | Blanco | 56/400.12 |
| 4,292,794 | 10/1981 | Gascon | 56/400.12 |

Primary Examiner—Paul J. Hirsch
Attorney, Agent, or Firm—James R. Haller; Gregory P. Kaihoi

[57] ABSTRACT

A rake attachment for combining two conventional rakes to be used as a pick-up rake. The attachment provides two handle clamps, which may be substantially identical, each clamp to be attached to the free end of a rake handle. One rake handle is attached to its clamp to prevent rotational and longitudinal movement of the handle with respect to the clamp. The second handle is fastened to its clamp so as to allow rotation of the rake handle. The two clamps are then detachably and hingeably connected. The second rake may be rotated to bring its tines in opposition with the tines of the first rake, for use as a pick-up rake. Alternately, the second rake may be rotated so as to nest its tines with those of the first rake, allowing use of the apparatus as a conventional rake. Further, the clamps may be detached from one another, allowing each rake to be used for conventional raking.

10 Claims, 11 Drawing Figures

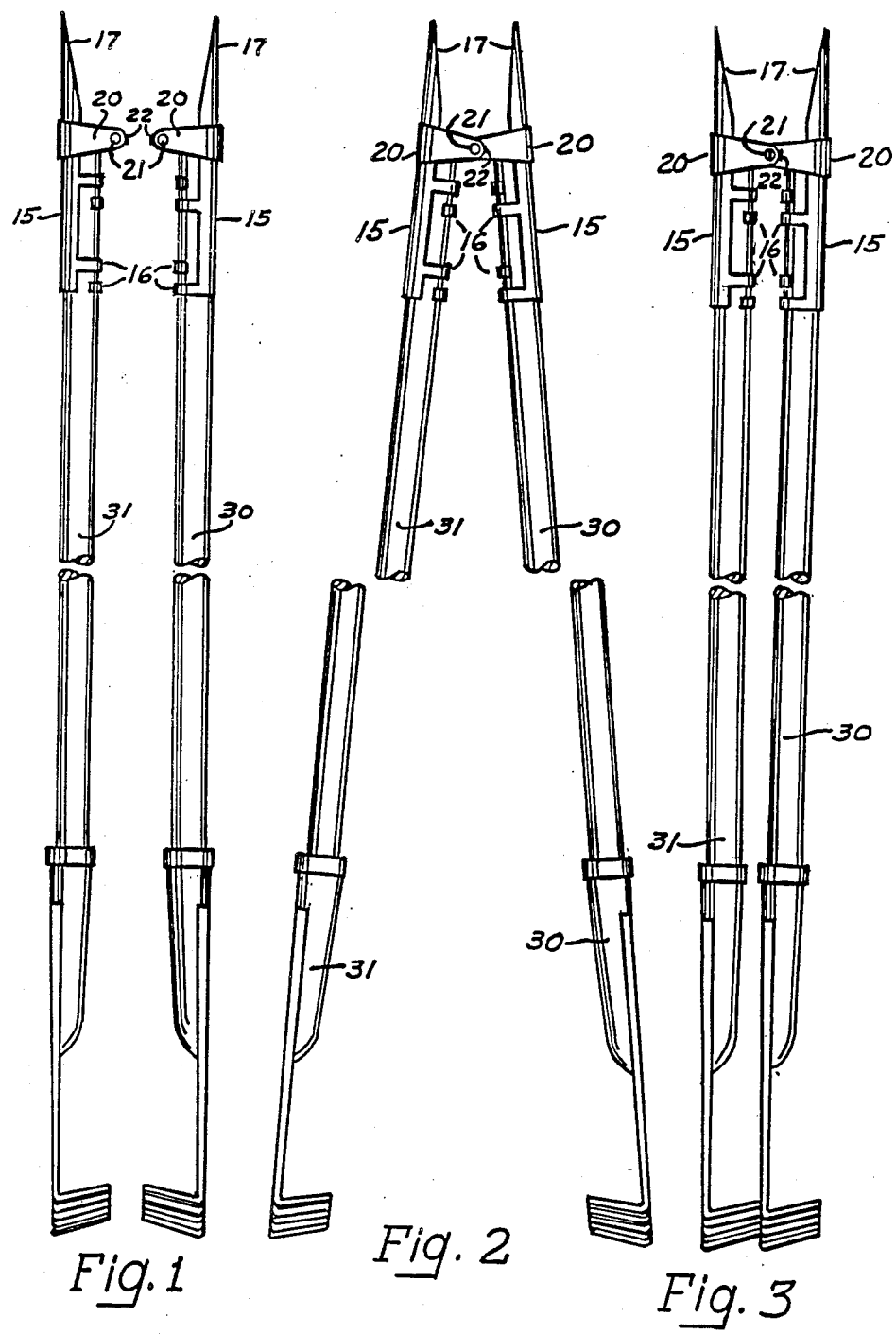

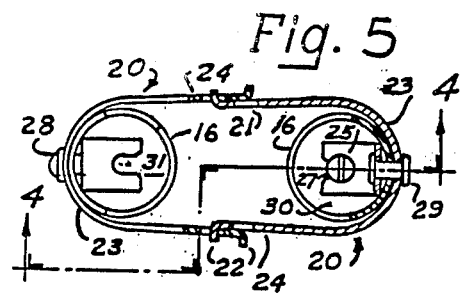
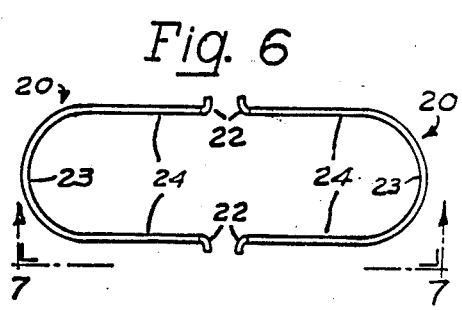
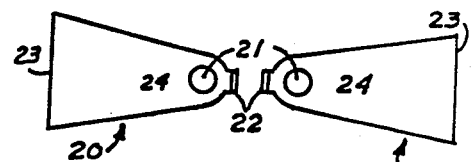
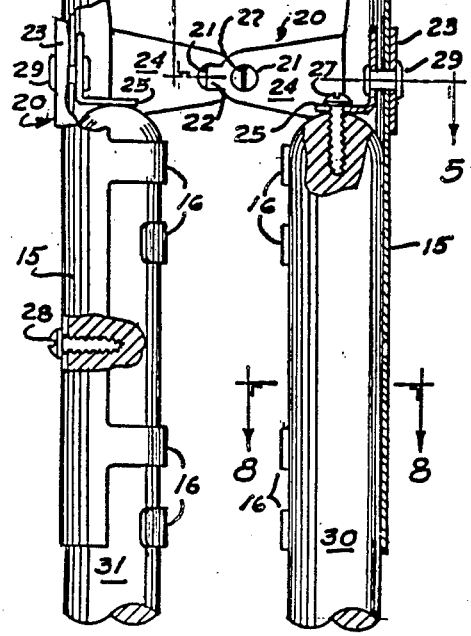
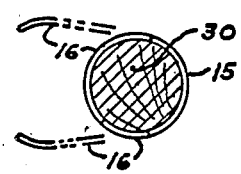

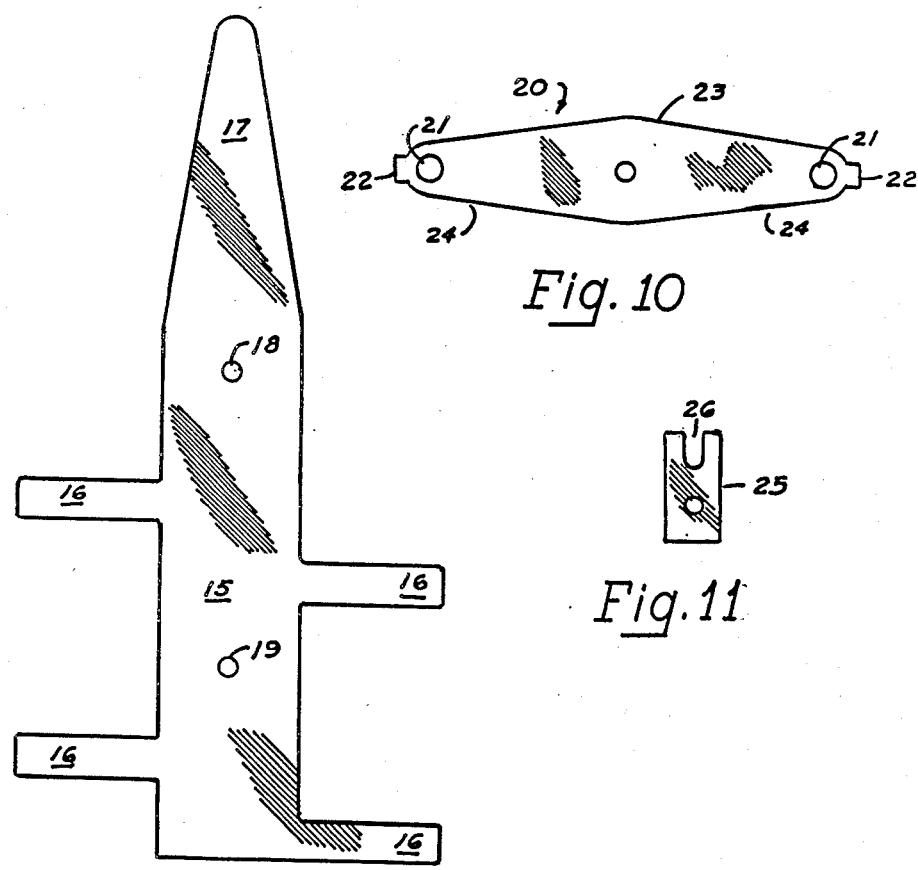

RAKE ATTACHMENT

TECHNICAL FIELD

This invention relates generally to hand rakes of the type commonly used for raking leaves and the like.

BACKGROUND ART

One of the more taxing tasks involved in hand raking is the picking up of leaves or other raked material from the ground. Typically this involves stooping over and gathering the raked material with one hand against the tines of a rake held in the other hand.

To improve the ease of this task, various apparatuses have been suggested whereby two opposing rake heads are hinged in some fashion and may be operated so as to grasp and pick up a load of raked material. Gallo, U.S. Pat. No. 2,902,815 (Sept. 8, 1959) discloses a rake for grasping raked material. Ross, U.S. Pat. No. 2,908,131 (Oct. 13, 1959) discloses a rake having two opposing rakes hinged together in scissors fashion just above the rake head. The tines of each rake are constructed to protrude respectively between and beyond the opposing tines, allowing the implement to be used as a conventional rake in the closed position. When a pile of material is gathered, the two handles may be separated, causing the respective heads to separate, and allowing the tines to close in upon the raked material. Lawrence, U.S. Pat. No. 3,833,250 (Sept. 3, 1974) discloses another rake variation involving a single handle with a rake head on each end. The handle is lockingly hinged at two points, allowing the two rake heads to swing together for use as a pick-up rake. Finally, Gascon, U.S. Pat. No. 4,292,794 (Oct. 6, 1981) discloses a further variation in which an auxiliary rake head is moveably mounted upon a rake of conventional design.

All of the foregoing pick-up rake inventions have a number of shortcomings. Most of them require considerable apparatus in addition to the conventional rake. This involves added cost of manufacture, added weight, and often complexity of operation. In addition, most of these inventions do not allow the use of the "auxiliary" rake head for conventional raking, thereby adding to the total number of rake heads which must be purchased.

DISCLOSURE OF INVENTION

The present invention involves a rake attachment for connecting a pair of conventional rakes, each rake having raking tines and an elongated handle connected at one end to the tines. The rake attachment is comprised of a first handle clamp attachable to one rake handle adjacent its free end and including anti-rotational means for preventing rotation of that rake handle about its longitudinal axis with respect to the clamp. The attachment has a second handle clamp attachable to the other rake handle adjacent its free end and including anti-translational means for preventing longitudinal movement of the rake with respect to the clamp but permitting rotation of the rake handle about its longitudinal axis with respect to the clamp. The two handle clamps are connected by a hinge which permits and limits the clamps to swinging with respect to one another in a common plane about an axis normal to the plane. When connected, the second rake may be rotated so as to nest its tines with those of the first rake. Alternately, the second rake may be rotated so as to bring its tines in opposition to those of the first rake, permitting raked material to be gathered between the opposed tines of the rakes.

BRIEF DESCRIPTION OF DRAWINGS

FIG. 1 is a side elevational view of two rakes fitted with the complimentary handle clamps;

FIG. 2 is a side elevational view of the rakes in FIG. 1 with the two clamps of the rake attachment hingeably connected, the rakes being in the open position with tines opposing each other;

FIG. 3 is a side elevational view of the rakes of FIG. 2 wherein the tines of the rakes are aligned and nested;

FIG. 4 is a side elevational partially broken-away view of the rake attachment, taken along line 4—4 of FIG. 5;

FIG. 5 is a top partial cross-sectional view of the rake attachment, taken along line 5—5 of FIG. 4;

FIG. 6 is a top view of U-shaped resilient bands typifying a hinge connection;

FIG. 7 is a side view of the U-shaped resilient bands taken along line 7—7;

FIG. 8 is a top cross-sectional view of one of the rake handles, taken along line 8—8 of FIG. 4. The phantom line represents fingers of a clamp before they are wrapped around the rake handle; and FIG. 9 depicts the shape of a handle clamp body utilized as it appears before being formed into the shape shown in the other figures.

FIG. 10 depicts the shape of a U-shaped resilient band as it appears before being formed into the shape shown in the other figures.

FIG. 11 depicts the shape of a fastener tab as it appears before being bent into its "L" shape as shown in the other figures.

BEST MODE FOR CARRYING OUT THE INVENTION

FIGS. 1-3 depict the relative ease and simplicity of use of the rake attachment. FIG. 1 shows two conventional hand rakes having handles of the same length, each fitted with a rake handle clamp. Although each rake has a handle clamp attached to its upper end, when detached the rakes can be used for conventional raking. In FIG. 2, the two handle clamps have been coupled together, combining the two rakes for use as a pick-up rake. In this configuration, the rakes are capable of swinging together and apart to facilitate the gathering and picking up of raked material between the opposed tines of the rakes. FIG. 3 illustrates the use of the assembly as a conventional rake in the assembled configuration. The rake handle (30) of one of the rakes is mounted in the rake attachment so that it may rotate therein. Thus, this rake may be rotated so that the tines of the two rakes nest together, allowing use of the assembly as a conventional hand rake.

FIGS. 4-5 depict in detail the construction of a preferred embodiment of the rake attachment. As can be seen by examination of these drawings, except for the two attachment screws (27) and (28), the two halves of the rake attachment are preferably of identical construction, facilitating economical manufacture.

The construction of each half of the rake attachment is relatively simple. Each handle clamp has a generally trough-shaped body (15) from which extend a plurality of fingers (16). The fingers (16) and body (15) define a generally cylindrical cavity for receiving the handle of a conventional rake. Carried by the trough-shaped body

(15) is a U-shaped resilient band (20) having a central portion (23) attached to the body (15) and arms (24) extending around and away from the body in the general direction of the fingers (16). Although any attachment means would suffice, preferably the band (20) is attached intermediate its length to the clamp body (15) by means of a rivet (29).

The construction of the bands (20) is detailed in FIGS. 6–7. Adjacent each end of the band (20) are located both a pivot tab (22) extending outwardly from the band, and a pivot hole (21) spaced inwardly of the tab. The band (20), as well as the rest of the rake attachment, may be manufactured from any sufficiently strong material, but preferably is stamped out of medium gauge sheet metal. Although the band (20), is generally rigid, the arms (24) must be slightly compressably resilient so that the arms of one band may be slightly compressed to allow their pivot tabs (22) to be fitted into the respective pivot holes (21) of the opposing band (20). In this way, the two handle clamps may be pivotally coupled and uncoupled as desired.

Although the bands (20) could be stamped out integrally with the handle clamp body (15) as are the fingers (16), for optimal resiliency it is preferable that the band be constructed as a separate piece. As can be seen upon close examination of FIG. 5, each band is manufactured so that its central portion (23) is of slightly greater circumference than would be necessary to fit around the body (15). This allows the band to flex along a greater portion of its length, increasing its resiliency.

The rivet (29) fastening the band (20) to the body (15) also attaches an L-shaped tab (25), as shown in FIG. 4. FIG. 5 shows that the part of the tab (25) which is normal to the axis of the rake handle (31) contains a slot or other opening for receiving a screw (27) or other fastener. When a screw (27) is inserted through the tab (25) into the wooden handle (30) of a conventional rake, the rake handle is rotatably secured to the handle clamp. The other rake handle (31) is affixed to a handle clamp by means of a screw (28) through the side of the body (15). In this way, this rake handle (31) is affixed to the handle clamp, prohibiting both rotation and longitudinal movement thereof.

In addition, the tab (25) of this clamp serves as a stop to contact the end of the rake handle (31) and to properly position the handle (31) longitudinally of the clamp.

Although not an essential part of the invention, one or both of the clamps may also contain a spike (17) extending vertically from the body (15). When a rake is not in use, this spike may be driven into the ground, allowing the rake to stand by itself.

FIGS. 9, 10, and 11 depict the shape of the three pieces used to construct a handle clamp of the preferred embodiment before such pieces are formed into their various configurations. As noted above, each handle clamp of the rake attachment may be identically manufactured, and therefore the templates illustrated in FIGS. 9, 10, and 11 may be used for both halves of the rake attachment. The respective pieces may be stamped out of sheet metal, or other suitable material, and formed into the configurations depicted in the various figures. The fingers (16) of each clamp may be formed into their circular shape as shown in FIGS. 4 and 5, or they may be formed as shown in the phantom lines of FIG. 8. In the latter case, the consumer would form the fingers around the rake handle, allowing the fingers to snugly receive handles of varying diameters. Although preferably the U-shaped band (20) of each clamp includes both the pivot holes (21) and the pivot tabs (20), the rake attachment might be constructed with one handle clamp having only pivot tabs (22) and the other clamp having only pivot holes (21).

In use, a rake handle is inserted into one handle clamp and secured by a screw (28) which prevents rotation and longitudinal translation, the rake tines pointing in the same direction as the arms (24). A second rake handle is secured in a second handle clamp by a screw (27) which allows rotation of the rake handle but prohibits longitudinal translation. The two clamps are then hingeably connected by resiliently compressing the arms (24) of one U-shaped band (20) and inserting its pivot tabs (22) into the respective pivot holes (21) of the other clamp. The second rake may be rotated until its tines nest in the tines of the first rake, allowing the apparatus to be used as a conventional rake. (See FIG. 3). When a pile of material is accumulated, the second rake may be rotated until its tines oppose the first rake, and the two rakes can be swung apart and together to pick up the raked material. (See FIG. 2). The two clamps may also be easily detached from each other to allow use of the rakes individually for conventional raking. (See FIG. 1).

While a preferred embodiment of the present invention has been described, it should be understood that various changes, adaptations and modifications may be made therein without departing from the spirit of the invention and the scope of the appended claims.

What is claimed is:

1. A rake attachment for connecting a pair of rakes, each rake having tines and an elongated handle connected at one end to the tines, comprising:
    (a) a first handle clamp attachable to one of the rake handles adjacent its free end, and including anti-rotational means for preventing rotation of that rake handle about its longitudinal axis with respect to the clamp;
    (b) a second handle clamp attachable to the other rake handle adjacent its free end and including anti-translational means for preventing longitudinal movement of the rake with respect to the clamp but permitting rotation of the rake handle about its longitudinal axis with respect to the clamp; and
    (c) hinge means for connecting the handle clamps and permitting the clamps to swing with respect to one another in a common plane about an axis normal to the plane, so that the second rake may be rotated to nest its tines with those of the first rake or may be rotated so as to bring its tines in opposition to those of the first rake, permitting raked material to be gathered between the opposed tines of the rakes.

2. The rake attachment of claim 1 wherein the hinge means comprises:
    a first U-shaped resilient band fastened to one of the handle clamps and having an outwardly-formed tab adjacent each end; and
    a second U-shaped resilient band fastened to the other handle clamp and having an aperture adjacent each end so that by resiliently compressing the first band and inserting the tabs thereof into the apertures of the second band the two handle clamps are hingeably and removeably connected.

3. The rake attachment of claim 1 wherein the anti-rotational means of the first handle clamp comprises a fastener extending radially, with respect to the longitudinal axis of the rake handle, through the handle clamp into the handle.

4. The rake attachment of claim 1 wherein the anti-translational means of the second handle clamp comprises a fastener extending axially through the clamp into the end of the rake handle.

5. The rake attachment of claim 1 wherein the clamps are formed from single sheets of 6. The rake attachment of claim 1 wherein each clamp includes a ground support spike extending outwardly parallel to the rake handle.

7. A rake attachment for connecting a pair of rakes each having raking tines and an elongated handle connected at one end to the tines, comprising:
 (a) a first handle clamp having
  (i) a generally trough-shaped body;
  (ii) a plurality of fingers extending from the body and defining with the body a generally cylindrically shaped cavity for receiving a generally cylindrical rake handle;
  (iii) a tab extending inwardly from the body, and having an aperture coaxial with the axis of the cylindrically shaped cavity;
  (iv) a fastener received in said aperture for attaching a rake handle while allowing rotational movement thereof; and
  (v) a U-shaped, resilient band carried by the body and having generally parallel arms extending past the cylindrical cavity, each arm having an aperture adjacent its end; and
 (b) a second handle clamp having
  (i) a generally trough-shaped body having an aperture;
  (ii) a fastener received in said aperture for attaching a rake handle and preventing rotation and longitudinal translation thereof with respect to the handle clamp;
  (iii) a plurality of semicircular fingers extending from the body and defining with the body a generally cylindrically shaped cavity for receiving a rake handle;
  (iv) a U-shaped resilient band carried by the body and having generally parallel arms extending past the cylindrical cavity, the arms each terminating in an outwardly-extending tab, formed so that upon resilient compression of the band, the tabs are hingeably received in the respective apertures of the band of the first handle clamp, allowing the attached rakes to swing with respect to one another in a common plane about an axis normal to the plane, so that the second rake may be rotated to nest its tines with those of the first rake or may be rotated so as to bring its tines in opposition to those of the first rake, permitting raked material to be gathered between the opposed tines of the rakes.

8. The rake attachment of claim 7 wherein the first handle clamp also includes an outwardly-extending tab at the end of each of the arms of the U-shaped band, and each arm of the U-shaped band of the second handle clamp has an aperture adjacent the end thereof.

9. A rake attachment for connecting a pair of rakes each having raking tines and an elongated handle connected at one end to the tines, comprising a pair of handle clamps, each clamp having
 a generally trough-shaped body with an aperture therein;
 a plurality of fingers extending from the body and defining with the body a cylindrically-shaped cavity for receiving a generally cylindrical rake handle;
 a tab extending inwardly from the body, and having an aperture coaxial with the axis of the cylindrically-shaped cavity; and
 a U-shaped resilient band carried by the body and having generally parallel arms extending past the cylindrical cavity, the arms each having an aperture adjacent its end, and each terminating in an outwardly-extending tab formed so that upon resilient compression of the band of one handle clamp the tabs thereof are hingeably received in the respective apertures of the band of the other handle clamp, allowing the two clamps to pivot with respect to one another in a common plane about an axis normal to the plane; one of the handle clamps further including a fastener received in the aperture of the inwardly extending tab for attaching a rake handle while allowing rotation thereof, and the other handle clamp including a fastener received in the aperture of the trough-shaped body for attaching a rake handle and preventing rotation and longitudinal translation thereof with respect to the handle clamp, whereby a first rake attached to the first handle clamp may be rotated so as to nest its tines with those of the rake attached to the second handle clamp, and whereby the first rake may also be rotated so as to bring its tines in opposition to those of the second rake, permitting raked material to be gathered between the opposed tines of the rakes.

10. A pick-up rake comprising:
 two rakes, each rake having tines and an elongated handle connected at one end to the tines;
 a first handle clamp attachable to one of the rake handles adjacent its free end, and including anti-rotational means for preventing rotation of that rake handle about its longitudinal axis with respect to the clamps;
 a second handle clamp attachable to the other rake handle adjacent its free end and including anti-translational means for preventing longitudinal movement of the rake with respect to the clamp but permitting rotation of the rake handle about its longitudinal axis with respect to the clamp; and
 hinge means for connecting the handle clamps and permitting the clamps to swing with respect to one another in a common plane about an axis normal to the plane, whereby the second rake may be rotated so as to nest its tines with those of the first rake or may be rotated so as to bring its tines in opposition to those of the first rake, permitting raked material to be gathered between the opposed tines of the rakes.

* * * * *